F. G. APPLEY.
Mousing-Hook.

No. 164,125. Patented June 8, 1875.

WITNESSES:
Chas. Nida
A. F. Terry

INVENTOR:
F. G. Appley
BY Munn & Co.
ATTORNEYS.

THE GRAPHIC CO. PHOTO-LITH. 39 & 41 PARK PLACE, N.Y.

UNITED STATES PATENT OFFICE.

FRANKLIN G. APPLEY, OF PROVIDENCE, RHODE ISLAND.

IMPROVEMENT IN MOUSING-HOOKS.

Specification forming part of Letters Patent No. 164,125, dated June 8, 1875; application filed October 31, 1874.

*To all whom it may concern:*

Be it known that I, FRANKLIN G. APPLEY, of Providence, Providence county, Rhode Island, have invented a new and useful Improvement in Mousing-Hooks, of which the following is a specification.

The invention will first be fully described, and then pointed out in the claim.

Figure 1:
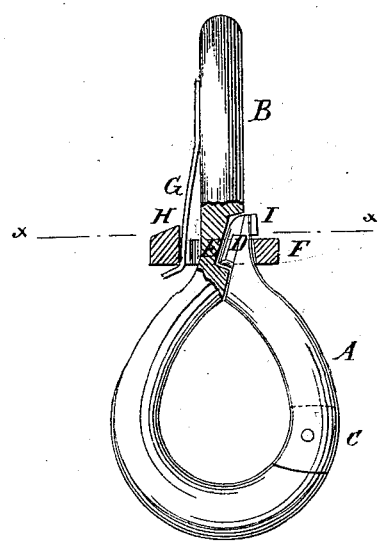
Figure 2:
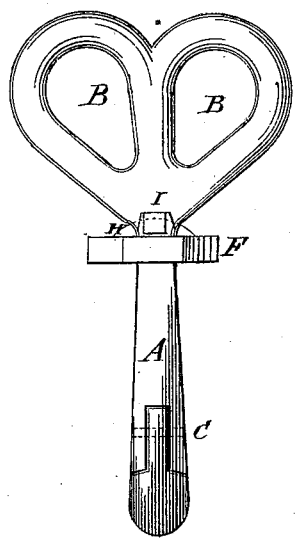
Figure 3:
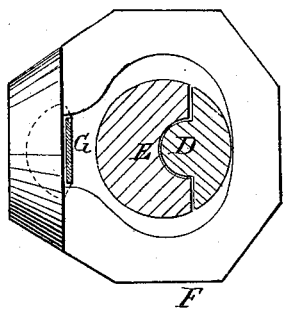

Figure 1 is a side view, showing the recess and shoulder. Fig. 2 is a view of the front side of the hook; and Fig. 3 is a cross-section of Fig. 1, taken on the line $x\ x$.

Similar letters of reference indicate corresponding parts.

A is the hook, the shank of which forms one or more loops. In the present invention I show two loops or eyes, B B. This hook A is jointed as seen at C, and has upon its end a shoulder, D, which fits into a recess, E, made in the shank, by means of which the hook is greatly strengthened. F is the ring or band, which is placed on the shank to hold the hook to the shank and keep the shoulder in the recess. G is a spring attached to the shank in any suitable manner to engage with the band and hold it to its work, as seen in Fig. 1. H is a lip on this ring, which prevents a rope from catching in the angle. I is a lug on the outer end of the hook, which keeps the ring from slipping off.

To make the hook fast, the ring is turned half round, and is provided with a recess beneath the lip, which allows it to slip over the lug I to release the hook.

This mousing-hook is indispensable in well-rigged vessels, and greatly relieves the sailor in properly adjusting the rigging and ropes thereof.

This hook may be used for other purposes, and is intended for all the purposes for which it is adapted.

Having thus described my invention, I claim as new and desire to secure by Letters Patent—

The mousing-hook ring F, having the lip H, as and for the purpose set forth.

FRANKLIN G. APPLEY.

Witnesses:
    T. B. MOSHER,
    ALEX. F. ROBERTS.